United States Patent
Denis (10) Patent No.: US 10,682,722 B2
(45) Date of Patent: Jun. 16, 2020

(54) SYSTEMS AND METHODS FOR MEASURING CHARACTERISTICS OF A WELDING CABLE WITH A LOW POWER TRANSCEIVER

(71) Applicant: ILLINOIS TOOL WORKS INC., Glenview, IL (US)

(72) Inventor: Marc Lee Denis, Lena, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/575,895

(22) Filed: Dec. 18, 2014

(65) Prior Publication Data

US 2016/0175971 A1 Jun. 23, 2016

(51) Int. Cl.
| | | |
|---|---|---|
| *B23K 9/10* | (2006.01) | |
| *H04B 3/54* | (2006.01) | |
| *B23K 9/095* | (2006.01) | |

(52) U.S. Cl.
CPC .......... *B23K 9/1062* (2013.01); *B23K 9/0953* (2013.01); *B23K 9/1087* (2013.01); *H04B 3/54* (2013.01); *H04B 2203/5416* (2013.01); *H04B 2203/5425* (2013.01)

(58) Field of Classification Search
CPC .. B23K 9/0953; B23K 9/1062; B23K 9/1087; B23K 37/0247; B23K 9/124; B23K 9/321; B23K 9/32; B23K 9/1043; H04B 3/54; H04B 2203/5416; H04B 2203/5425
USPC .......................................... 219/137 R, 137.9
See application file for complete search history.

(56) References Cited

U.S. PATENT DOCUMENTS

| | | | |
|---|---|---|---|
| 3,689,734 A | 9/1972 | Burley | |
| 3,689,737 A | 9/1972 | Eckles | |
| 3,930,209 A * | 12/1975 | Popick | H04B 3/40 327/285 |
| 4,359,622 A | 11/1982 | Dostoomian | |
| 4,384,188 A | 5/1983 | Wright | |
| 4,438,317 A | 3/1984 | Ueguri | |

(Continued)

FOREIGN PATENT DOCUMENTS

| | | |
|---|---|---|
| CN | 86103586 | 12/1987 |
| CN | 1281280 | 1/2001 |

(Continued)

OTHER PUBLICATIONS

International Search Report from PCT application No. PCT/US2015/059840, dated Feb. 24, 2016, 12 pgs.

*Primary Examiner* — Lorne E Meade
*Assistant Examiner* — Joe E Mills, Jr.
(74) *Attorney, Agent, or Firm* — McAndrews, Held & Malloy, Ltd.

(57) ABSTRACT

A welding system is provided. The welding system includes a low power transceiver configured to be coupled to a weld cable. The low power transceiver includes a low power transmitter, a low power receiver, and a first processor. The low power receiver is configured to transmit one or more unmodulated tones through the weld cable to a welding power supply. The low power receiver is configured to receive the one or more unmodulated tones through the weld cable from the welding power supply. The first processor is configured to determine one or more channel equalization filter coefficients related to the weld cable corresponding to a distortive characteristic of the weld cable.

18 Claims, 2 Drawing Sheets

(56) References Cited

U.S. PATENT DOCUMENTS

| | | | | |
|---|---|---|---|---|
| 4,471,399 A * | 9/1984 | Udren | H02J 13/0024 | 340/12.33 |
| 4,479,215 A * | 10/1984 | Baker | H04B 3/542 | 375/133 |
| 4,521,671 A | 6/1985 | Fronius | | |
| 4,544,826 A | 10/1985 | Nakanishi | | |
| 4,749,935 A | 6/1988 | Osborne | | |
| 4,794,232 A | 12/1988 | Kimbrough | | |
| 4,866,247 A | 9/1989 | Parks | | |
| 4,947,021 A | 8/1990 | Stava | | |
| 5,059,766 A | 10/1991 | Gilliland | | |
| 5,278,390 A | 1/1994 | Blankenship | | |
| 5,357,078 A | 10/1994 | Smith | | |
| 5,591,355 A | 1/1997 | Ishikawa | | |
| 5,600,550 A | 2/1997 | Cook, II | | |
| 5,614,811 A * | 3/1997 | Sagalovich | H02J 13/0034 | 307/140 |
| 5,625,863 A * | 4/1997 | Abraham | H04B 1/707 | 348/E7.05 |
| 5,841,807 A * | 11/1998 | Hannebauer | H04B 1/707 | 375/142 |
| 5,864,116 A | 1/1999 | Baker | | |
| 5,991,169 A | 11/1999 | Kooken | | |
| 6,015,964 A | 1/2000 | Baker | | |
| 6,104,707 A * | 8/2000 | Abraham | H02J 13/0031 | 340/12.36 |
| 6,111,216 A | 8/2000 | Stava | | |
| 6,154,488 A * | 11/2000 | Hunt | H02J 13/0024 | 340/12.33 |
| 6,160,241 A | 12/2000 | Stava | | |
| 6,172,888 B1 | 1/2001 | Jochi | | |
| 6,225,598 B1 | 5/2001 | Nihei | | |
| 6,275,144 B1 * | 8/2001 | Rumbaugh | H04B 3/54 | 340/538.11 |
| 6,288,631 B1 * | 9/2001 | Shinozaki | H04B 3/542 | 340/12.33 |
| 6,321,139 B1 | 11/2001 | Terada | | |
| 6,321,167 B1 | 11/2001 | Jochi | | |
| 6,359,258 B1 * | 3/2002 | Blankenship | B23K 9/10 | 219/130.01 |
| 6,365,874 B1 | 4/2002 | Stava | | |
| 6,570,394 B1 * | 5/2003 | Williams | H04B 3/46 | 324/620 |
| 6,596,970 B2 | 7/2003 | Blankenship | | |
| 6,649,869 B2 | 11/2003 | Reynolds | | |
| 6,710,297 B1 | 3/2004 | Artelsmair | | |
| 6,717,108 B2 | 4/2004 | Hsu | | |
| 6,930,279 B2 | 8/2005 | Myers | | |
| 7,049,545 B2 | 5/2006 | Matus | | |
| 7,049,547 B1 * | 5/2006 | Brunner | B23K 9/1062 | 219/130.5 |
| 7,064,290 B2 | 6/2006 | Blankenship | | |
| 7,076,215 B1 * | 7/2006 | Moliere | H03J 1/005 | 455/77 |
| 7,105,772 B2 | 9/2006 | Houston | | |
| 7,173,214 B2 | 2/2007 | Nadzam | | |
| 7,260,325 B2 * | 8/2007 | Meroth | H04L 12/437 | 370/221 |
| 7,301,308 B2 | 11/2007 | Aker | | |
| 8,049,140 B2 | 11/2011 | Kawamoto | | |
| 8,199,536 B2 | 6/2012 | Mangraviti | | |
| 8,225,598 B2 | 7/2012 | Haeberer | | |
| 8,269,141 B2 | 9/2012 | Daniel | | |
| 8,278,882 B2 | 10/2012 | Gotou | | |
| 8,410,398 B2 | 4/2013 | Daniel | | |
| 8,455,794 B2 | 6/2013 | Vogel | | |
| 8,525,077 B2 | 9/2013 | Peters | | |
| 8,546,729 B2 | 10/2013 | Derda | | |
| 8,581,147 B2 | 11/2013 | Kooken | | |
| 8,653,413 B2 | 2/2014 | Vogel | | |
| 8,785,816 B2 | 7/2014 | Kooken | | |
| 9,089,922 B2 * | 7/2015 | Bunker | B23K 9/1056 | |
| 2001/0001616 A1 * | 5/2001 | Rakib | H03M 13/256 | 375/259 |
| 2003/0156014 A1 * | 8/2003 | Kodama | H04B 3/54 | 375/258 |
| 2004/0069759 A1 * | 4/2004 | Davidson | B23K 9/091 | 219/130.5 |
| 2005/0016975 A1 * | 1/2005 | Reynolds | B23K 9/1087 | 219/132 |
| 2005/0230372 A1 * | 10/2005 | Ott | B23K 9/1087 | 219/132 |
| 2006/0054610 A1 | 3/2006 | Morimoto | | |
| 2006/0138113 A1 * | 6/2006 | Ott | B23K 9/1087 | 219/132 |
| 2006/0175313 A1 | 8/2006 | Kooken | | |
| 2006/0226130 A1 | 10/2006 | Kooken | | |
| 2006/0243716 A1 | 11/2006 | Stava | | |
| 2007/0080154 A1 * | 4/2007 | Ott | B23K 9/095 | 219/132 |
| 2007/0181547 A1 | 8/2007 | Vogel | | |
| 2008/0078812 A1 | 4/2008 | Peters | | |
| 2008/0198650 A1 * | 8/2008 | Shalvi | G11C 16/26 | 365/185.02 |
| 2008/0311938 A1 * | 12/2008 | Song | H04W 74/06 | 455/500 |
| 2010/0187914 A1 * | 7/2010 | Rada | G05F 1/70 | 307/105 |
| 2010/0308027 A1 | 12/2010 | Vogel | | |
| 2011/0043374 A1 * | 2/2011 | Bannister | H04B 3/542 | 340/870.02 |
| 2011/0073569 A1 * | 3/2011 | Rappl | B23K 9/095 | 219/73.2 |
| 2011/0108536 A1 | 5/2011 | Inada | | |
| 2012/0000895 A1 | 1/2012 | Sato | | |
| 2012/0076212 A1 * | 3/2012 | Zeppetelle | H04B 3/54 | 375/259 |
| 2012/0161516 A1 * | 6/2012 | Koshin | H02J 1/10 | 307/23 |
| 2012/0195384 A1 * | 8/2012 | Sato | H04B 3/466 | 375/257 |
| 2013/0092672 A1 | 4/2013 | Peters | | |
| 2013/0119036 A1 * | 5/2013 | Daniel | B23K 9/095 | 219/130.21 |
| 2013/0128938 A1 * | 5/2013 | Yanagisawa | H04B 3/46 | 375/224 |
| 2013/0214599 A1 * | 8/2013 | Taira | H02M 7/537 | 307/31 |
| 2013/0249397 A1 * | 9/2013 | Chandran | H05B 37/0263 | 315/85 |
| 2013/0264319 A1 * | 10/2013 | Temby | B23K 9/095 | 219/130.1 |
| 2013/0327753 A1 | 12/2013 | Roth | | |
| 2013/0327754 A1 * | 12/2013 | Salsich | B23K 9/124 | 219/137.71 |
| 2014/0001169 A1 * | 1/2014 | Enyedy | B23K 9/1006 | 219/137.71 |
| 2014/0233620 A1 * | 8/2014 | Bernheim | G05B 13/02 | 375/224 |
| 2014/0263256 A1 | 9/2014 | Rappl | | |
| 2014/0265897 A1 * | 9/2014 | Taipale | H05B 37/02 | 315/200 R |
| 2014/0374397 A1 | 12/2014 | Vogel | | |
| 2015/0043624 A1 * | 2/2015 | Williams | H04B 3/46 | 375/222 |
| 2015/0117464 A1 * | 4/2015 | Miyamoto | H04L 67/2833 | 370/429 |
| 2015/0244474 A1 * | 8/2015 | Young | H04B 3/54 | 375/130 |

FOREIGN PATENT DOCUMENTS

| | | |
|---|---|---|
| CN | 101743729 | 6/2010 |
| EP | 0970775 | 1/2000 |
| EP | 1138429 | 10/2001 |
| EP | 1748573 | 1/2007 |
| FR | 2850463 | 7/2004 |
| GB | 2393338 | 3/2004 |
| JP | S61273260 | 12/1986 |

(56) References Cited

FOREIGN PATENT DOCUMENTS

| JP | 2001276971 | 10/2001 |
|---|---|---|
| KR | 20110122315 | 11/2011 |
| WO | 2008140398 | 1/2008 |

* cited by examiner

SYSTEMS AND METHODS FOR MEASURING CHARACTERISTICS OF A WELDING CABLE WITH A LOW POWER TRANSCEIVER

BACKGROUND

The present disclosure relates generally to welding systems, and more particularly to systems and methods for measuring characteristics of a welding cable.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas) is provided to the weld in an appropriate amount at the desired time. For example, metal inert gas (MIG) welding typically relies on a wire feeder to enable a welding wire to reach a welding torch. The wire is continuously fed during welding to provide filler metal. A welding power source ensures that arc heating is available to melt the filler metal and the underlying base metal.

In certain applications, power cables supply power from the welding power source to a welding torch performing a welding application. For example, the welding power source may provide a welding voltage that may be utilized between the welding torch and a workpiece to perform the welding application. However, the arrangement and characteristics of power cables within the welding system may cause distortions on transmitted data, weld process current, and/or weld process voltage. Accordingly, it may be beneficial to provide for systems and methods that efficiently and accurately compensate for various distortions.

BRIEF DESCRIPTION

Certain embodiments commensurate in scope with the originally claimed present disclosure are summarized below. These embodiments are not intended to limit the scope of the claimed present disclosure, but rather these embodiments are intended only to provide a brief summary of possible forms of the present disclosure. Indeed, the present disclosure may encompass a variety of forms that may be similar to or different from the embodiments set forth below.

In one embodiment, a welding system is provided. The welding system includes a low power transceiver configured to be coupled to a weld cable. The low power transceiver includes a low power transmitter, a low power receiver, and a first processor. The low power receiver is configured to transmit one or more unmodulated tones through the weld cable to a welding power supply. The low power receiver is configured to receive the one or more unmodulated tones through the weld cable from the welding power supply. The first processor is configured to determine one or more channel equalization filter coefficients related to the weld cable corresponding to a distortive characteristic of the weld cable.

In another embodiment, a method is provided. The method includes transmitting an initial reference tone through a weld cable from a low power transmitter coupled to the weld cable. The method also includes receiving a reference tone through the weld cable at a low power receiver coupled to the weld cable and applying a digital filter function to the reference tone to determine one or more differences between a template for the initial reference tone and the received reference tone. The method also includes determining one or more channel equalization filter coefficients based on the differences between the template reference tone and the received reference tone. The method also includes compensating for frequency and time dependent amplitude and phase distortion within the weld cable based on the one or more channel equalization filter coefficients.

In another embodiment, a welding system is provided. The welding system includes a low power transceiver configured to be coupled to a weld cable. The low power transceiver includes a low power transmitter, a low power receiver, and a first processor. The low power receiver is configured to transmit one or more unmodulated tones through the weld cable to a wire feeder. The low power receiver is configured to receive the one or more unmodulated tones through the weld cable from the wire feeder. The first processor is configured to determine one or more channel equalization filter coefficients related to the weld cable corresponding to a distortive characteristic of the weld cable.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

In certain applications, power cables supply power from the welding power source to a welding torch performing a welding application. For example, the welding power source may provide a welding voltage that may be utilized between the welding torch and a workpiece to perform the welding application. However, the arrangement and characteristics of power cables within the welding system may cause distortions on transmitted data, weld process current, and/or weld process voltage. In some situations, measuring voltage and/or current waveforms at a location proximate to the welding torch may be utilized to determine and/or correct for variations in the desired and/or delivered process current and/or voltage. In other situations, the static and dynamic characteristic impedances of the welding cable can be measured so as to allow the computation of a compensation network or algorithm. However, measuring the static and dynamic characteristic impedances of the welding cable during operation of the welding system may be a cumbersome and inefficient process. Accordingly, it may be beneficial to provide for systems and methods that efficiently and accurately compensate for various distortions.

Embodiments of the present disclosure generally relate to a welding system having a welding power supply, a wire feeder, and a welding torch. In certain embodiments, the welding system may also include a weld cable communications (WCC) system. The welding power supply may include a weld cable configured to provide power to one or more components of the welding system, such as the wire feeder or the welding torch. For example, the weld cable may be configured to provide a welding voltage to the welding torch to perform a welding operation on a workpiece. In certain embodiments, the weld cable may be configured to also transmit and/or receive communications or information related to one or more welding operating parameters (e.g., weld voltage, wire speed) of the welding system. In particular, the WCC system may be configured to transmit the weld data over the weld cable.

In certain embodiments, the WCC system may additionally be utilized to compensate for distortive characteristics caused by various characteristics of the weld cable. The distortive characteristic may include a frequency and time dependent amplitude and phase distortion of the weld cable. For example, the WCC system may be configured to compensate (or adjust) for frequency and time dependent amplitude and phase distortion caused by any characteristic or physical property of the weld cable that may influence the welding voltage, the weld data, or anything which may be transmitted through the weld cable. As a further example, the WCC system may also be configured to compensate for external variables that may cause interference (e.g., distortion) within the weld cable. In certain embodiments, the WCC system includes a low power transceiver and WCC circuitry. The WCC circuitry may be disposed within any component of the welding system (e.g., welding power supply, wire feeder, welding torch, and so forth) and may include one or more of a digital to analog convertor (e.g., DAC, which may function as a transmitter), an analog to digital convertor (e.g., ADC, which may function as a receiver, etc.), and a filter function. In certain embodiments, the low power transceiver may be disposed along and/or coupled to the weld cable, and may be configured to transmit and/or receive one or more tones or signals (e.g., data signals, reference signals). Further, in certain embodiments, one or more components of the WCC circuitry may be configured to transmit and/or receive one or more tones or signals, and may process the tones or signals to determine values (e.g., coefficients) corresponding to the frequency and time dependent amplitude and phase distortion.

Figure 1:
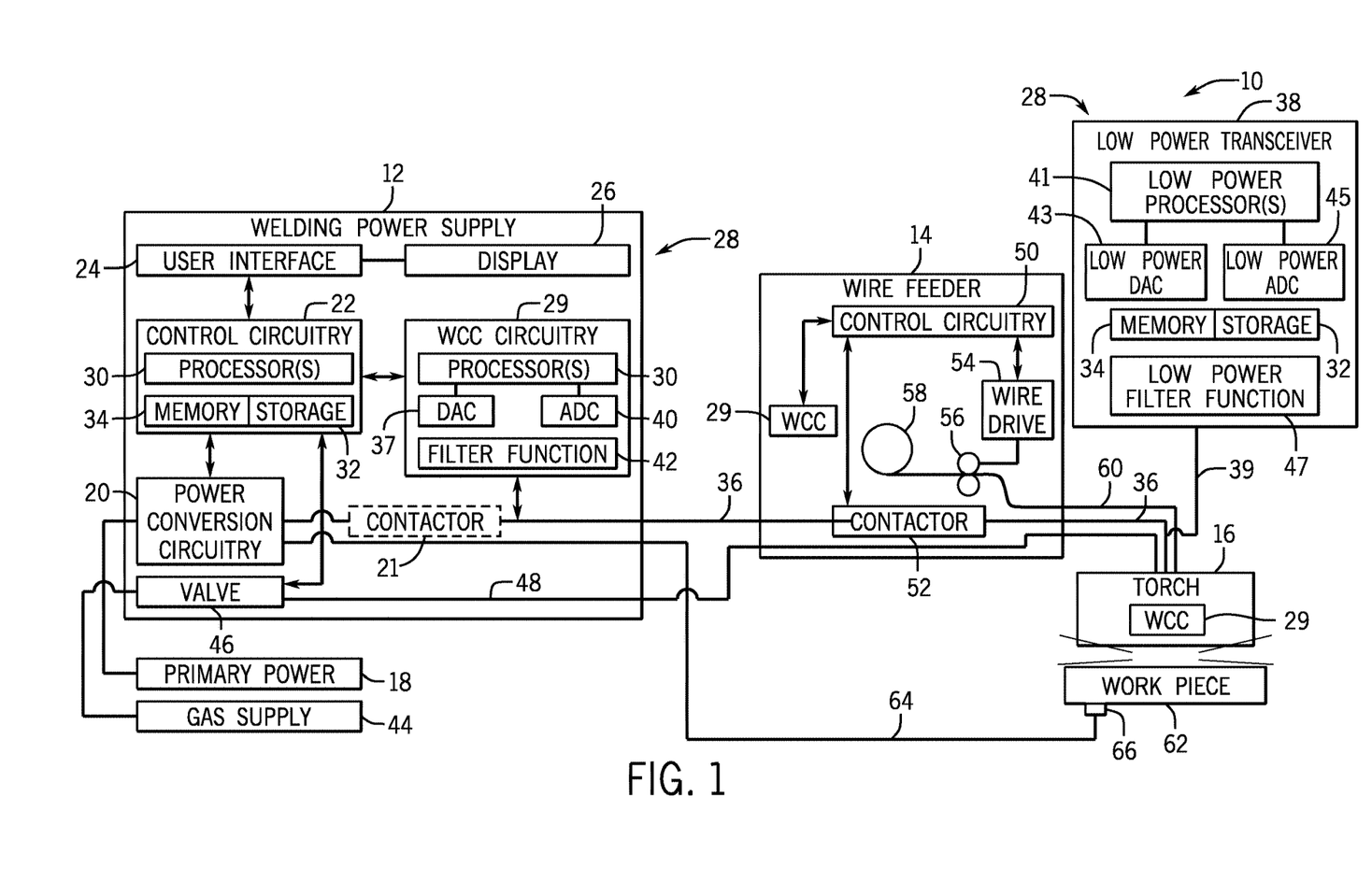
FIG. 1 is a block diagram of an embodiment of a welding system with a welding power supply having a low power transceiver coupled to a weld cable, in accordance with aspects of the present disclosure.

Turning now to the drawings, FIG. 1 is a block diagram of an embodiment of a welding system 10 having a welding power supply 12, a wire feeder 14, and a welding torch 16. The welding system 10 powers, controls, and supplies consumables to a welding application. In certain embodiments, the welding power source 12 directly supplies input power to the welding torch 16. The welding torch 16 may be a torch configured for stick welding, tungsten inert gas (TIG) welding, or gas metal arc welding (GMAW), based on the desired welding application. In the illustrated embodiment, the welding power source 12 is configured to supply power to the wire feeder 14, and the wire feeder 14 may be configured to route the input power (welding power) to the welding torch 16. In addition to supplying an input power, the wire feeder 14 may supply a filler metal to a welding torch 14 for various welding applications (e.g., GMAW welding, flux core arc welding (FCAW)).

The welding power supply 12 receives primary power 18 (e.g., from the AC power grid, an engine/generator set, a battery, or other energy generating or storage devices, or a combination thereof), conditions the primary power, and provides an output power (welding power) to one or more welding devices in accordance with demands of the system 10. The primary power 18 may be supplied from an offsite location (e.g., the primary power may originate from the power grid). Accordingly, the welding power supply 12 includes power conversion circuitry 20 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 20 may be configured to convert the primary power 18 to both weld and auxiliary power outputs. However, in other embodiments, the power conversion circuitry 20 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 22 to control the operation of the welding power supply 12. The welding power supply 12 also includes a user interface 24. The control circuitry 22 may receive input from the user interface 24 through which a user may choose a process and input desired parameters (e.g., voltages, currents, particular pulsed or non-pulsed welding regimes, and so forth). The user interface 24 may receive inputs using any input device, such as via a keypad, keyboard, buttons, touch screen, voice activation system, wireless device, etc. Furthermore, the control circuitry 22 may control operating parameters based on input by the user as well as based on other current operating parameters. Specifically, the user interface 24 may include a display 26 for presenting, showing, or indicating, information to an operator. The control circuitry 22 may also include interface circuitry for communicating data to other devices in the system 10, such as the wire feeder 14. For example, in some situations, the welding power supply 12 may wirelessly communicate with other welding devices within the welding system 10. Further, in some situations, the welding power supply 12 may communicate with other welding devices using a wired connection, such as by using a network interface controller (NIC) to communicate data via a network (e.g., the ETHERNET, 10baseT, 10base100, etc.). In particular, the control circuitry 22 may communicate and interact with weld cable communications (WCC) circuitry 29, as further described in detail below.

The control circuitry 22 includes at least one controller or processor 30 that controls the operations of the welding power supply 12, and may be configured to receive and process multiple inputs regarding the performance and demands of the system 10. Furthermore, the processor 30 may include one or more microprocessors, such as one or more "general-purpose" microprocessors, one or more special-purpose microprocessors and/or ASICS, or some combination thereof. For example, the processor 30 may include one or more digital signal processors (DSPs).

The control circuitry 22 may include a storage device 32 and a memory device 34. The storage device 32 (e.g., nonvolatile storage) may include ROM, flash memory, a hard drive, or any other suitable optical, magnetic, or solid-state storage medium, or a combination thereof. The storage device 32 may store data (e.g., data corresponding to a welding application), instructions (e.g., software or firmware to perform welding processes), and any other suitable data. As may be appreciated, data that corresponds to a welding application may include an attitude (e.g., orientation) of a welding torch, a distance between the contact tip and a workpiece, a voltage, a current, welding device settings, and so forth.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor-executable instructions (e.g., firmware or software) for the processor 30 to execute. In addition, a variety of control regimes for various welding processes, along with associated settings and parameters, may be stored in the storage device 32 and/or memory device 34, along with code configured to provide a specific output (e.g., initiate wire feed, enable gas flow, capture welding current data, detect short circuit parameters, determine amount of spatter) during operation.

In certain embodiments, the welding power flows from the power conversion circuitry 20 through a weld cable 36 to the wire feeder 14 and the welding torch 16. In certain embodiments, the welding power supply 12 may include a contactor 21 (e.g., high amperage relay) that is controlled by the control circuitry 22 and configured to enable or inhibit welding power to continue to flow to the weld cable 36, and from the weld cable 36 to the wire feeder 14. In certain embodiments, the contactor 21 may be a electromechanical device, while in other embodiments, the contactor 21 may be any other suitable device, such as a solid state device.

Furthermore, in certain embodiments, the weld cable 36 may also be configured to transmit and/or receive welding data, such that the welding power and weld data are provided and transmitted together over the weld cable 36. In particular, the WCC system 28 may be communicatively coupled to the weld cable 36 to communicate (e.g., send/receive) data over the weld cable 36. The WCC system 28 may be implemented based on various types of power line communications methods and techniques. For example, the WCC system 28 may utilize IEEE standard P1901.2 to provide data communications over the weld cable 36. In this manner, the weld cable 36 may be utilized to provide welding power from the welding power supply 12 to the wire feeder 14 and/or the welding torch 16. Furthermore, the weld cable 36 may also be utilized to transmit (and/or receive) data communications to the wire feeder 14 and/or the welding torch 16.

Figure 2:
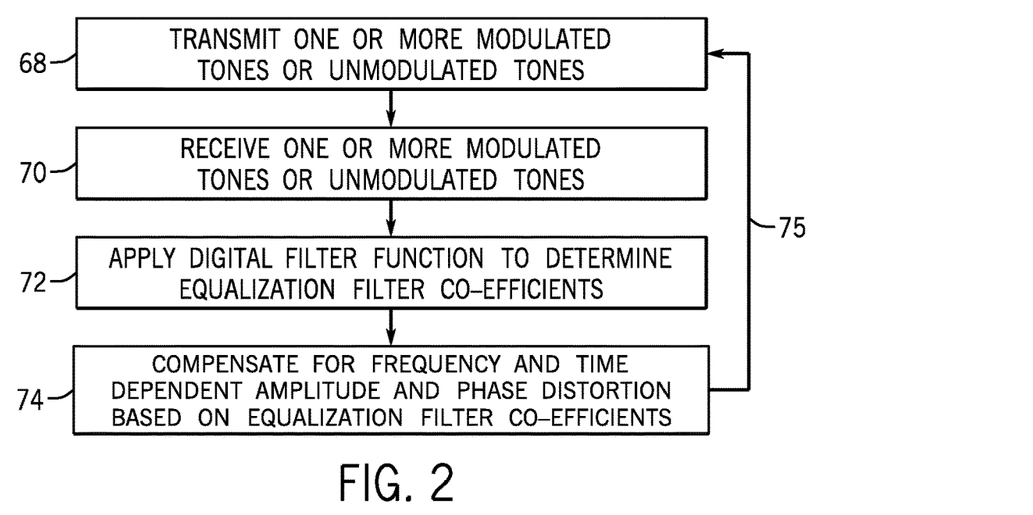
FIG. 2 is a flow diagram of an embodiment of a method for compensating for frequency and time dependent amplitude and phase distortion utilizing one or more channel equalization filter coefficients, in accordance with aspects of the present disclosure.
Figure 3:
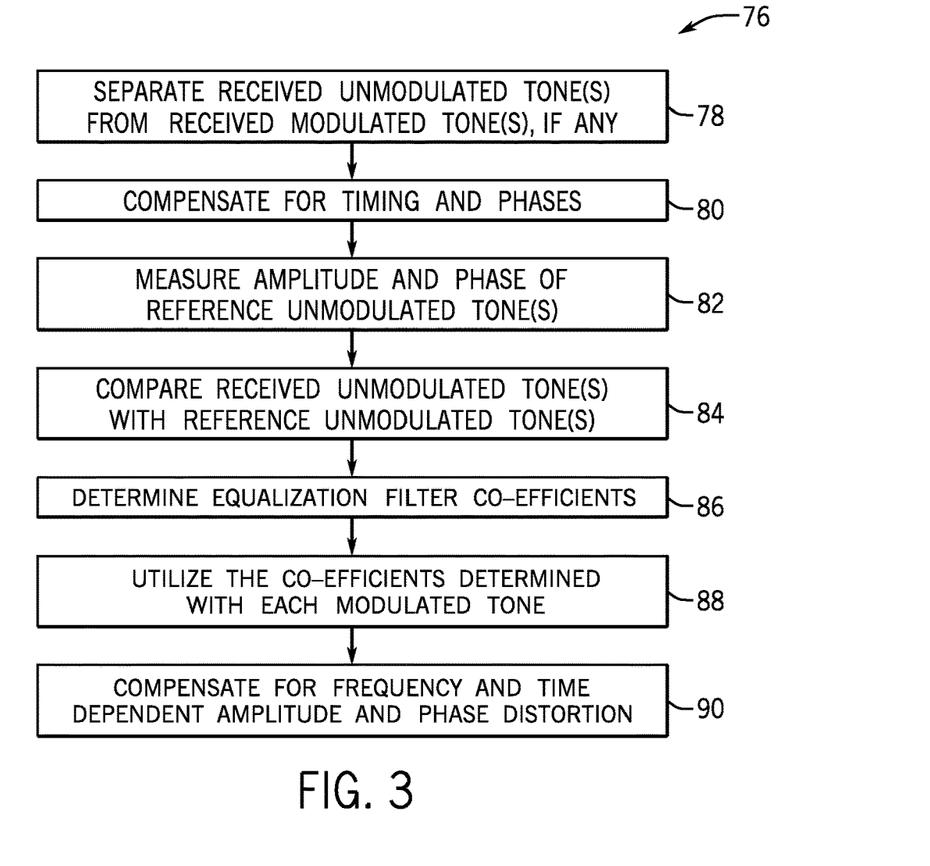
FIG. 3 is a flow diagram of an embodiment of a method for calculating the one or more channel equalization filter coefficients of FIG. 2, in accordance with aspects of the present disclosure.

In certain embodiments, the WCC system 28 may be utilized to compensate for frequency and time dependent amplitude and phase distortions (e.g., distortive characteristics) of the weld cable 36, as further described with respect to FIGS. 2-3. In the illustrated embodiment, the WCC system 28 includes WCC circuitry 29 and a low power transceiver 38. In certain embodiments, the WCC circuitry 29 may be disposed within a component of the welding system 10, such as the welding power supply 12, the wire feeder 14, or the welding torch 16. The low power transceiver 38 may be an accessory device that is coupled or retroactively coupled to the weld cable 36. The WCC circuitry 29 may be configured to work simultaneously and/or independently of the low power transceiver 38, as further described below.

In certain embodiments, the WCC circuitry 29 may include one or more processors 30, a digital to analog convertor 37 (e.g. DAC 37, which may function as a DAC 37), an analog to digital converter 40 (e.g., ADC 40, which may function as a ADC 40), and a filter function 42 (e.g., filter function 42, digital filter function circuitry, filter function software executable by the one or more processors 30, or any combination thereof). The WCC circuitry 29 may be utilized to determine channel equalization filter coefficients representative of a distortive characteristic and/or a distortion related to a weld cable 36. Specifically, the distortive characteristic may be a frequency and time dependent amplitude and phase distortion (e.g., amplitude and/or phase distortion that is both frequency dependent and time dependent), as further described with respect to FIGS. 2-3. Further, the WCC circuitry 29 may be configured to utilize the channel equalization filter coefficients to compensate for the distortive characteristic of the weld cable 36. In certain embodiments, the WCC circuitry 29 may include one or more processors 30 separate from the processors 30 of the control circuitry 22. In certain embodiments, the WCC circuitry 29 may utilize the processors 30 of the control circuitry 22. In certain embodiments, the WCC circuitry 29 may be incorporated within, or may be coupled to, the control circuitry 22. Indeed, it should be noted that the components of the WCC circuitry 29 (e.g., the DAC 37, the ADC 40, and the filter function 42, etc.) may enable the WCC system 28 to not only determine the channel equalization filter coefficients that correspond to one or more distortive characteristics of the weld cable 36, but may additionally allow for complex weld related communications.

In certain embodiments, the low power transceiver 38 may be utilized as an accessory device that is disposed along the weld cable 36 and/or retroactively coupled to the weld cable 36. The low power transceiver 38 may include a low power processor 41 (e.g., a microcontroller 41), a low power digital to analog convertor 43 (e.g., DAC 43, configured to function as a low power transmitter 43), a low power analog to digital convertor 45 (e.g., ADC 45, configured to function as a low power receiver 45), a low power filter function 47, the memory 34, and/or the storage 32. Indeed, the low power transceiver 38 may be configured to function substantially similar to the WCC circuitry 29. For example, the low power transceiver 38 may be utilized to determine channel equalization filter coefficients representative of a distortive characteristic and/or a distortion related to the weld cable 36. Specifically, the distortive characteristic may be a frequency and time dependent amplitude and phase distortion (e.g., amplitude and/or phase distortion that is both frequency dependent and time dependent), as further described with respect to FIGS. 2-3. Further, the low power transceiver 38 may be configured to utilize the channel equalization filter coefficients to compensate for the distortive characteristic of the weld cable 36. The low power transceiver 38 may be configured to work simultaneously with and/or independently of the WCC circuitry 29.

In certain embodiments, the low power transceiver 38 may be retroactively disposed within a component of the welding system 10 and/or within the WCC circuitry 29, as further described in detail below. For example, in some situations, the WCC circuitry 29 may include the low power DAC 43, the low power ADC 45, and/or the low power filter function 47 instead of the DAC 37, the ADC 40, and/or the filter function 42, respectively. In other embodiments, the WCC circuitry 29 may be configured to also include both the low power components (e.g., the low power DAC 43, the low power ADC 45, and/or the low power filter function 47) in addition to the DAC 37, the ADC 40, and/or the filter function 42. For example, in situations where the WCC circuitry 29 also includes the ADC 40 and the filter function 42, the WCC circuitry 29 may additionally be configured to transmit and receive welding data to/from the WCC system 28, the welding power supply 12, and/or any other component within the welding system 10.

A gas supply 44 provides shielding gases, such as argon, helium, carbon dioxide, and so forth, depending upon the welding application. The shielding gas flows to a valve 46, which controls the flow of gas, and if desired, may be selected to allow for modulating or regulating the amount of gas supplied to a welding application. The valve 46 may be opened, closed, or otherwise operated by the control circuitry 22 to enable, inhibit, or control gas flow (e.g., shielding gas) through the valve 46. Shielding gas exits the valve 46 and flows through a cable 48 (which in some implementations may be packaged with the welding power output) to the wire feeder 14 which provides the shielding gas to the welding application. As may be appreciated, certain embodiments of the welding system 10 may not include the gas supply 44, the valve 46, and/or the cable 48.

In certain embodiments, the wire feeder 14 may use the welding power to power the various components in the wire feeder 14, such as to power control circuitry 50. As noted above, the weld cable 36 may be configured to provide or supply the welding power. The welding power supply 12 may also communicate with the wire feeder 14 using the cable 36 and the WCC system 28. In certain embodiments, the wire feeder 14 may include the WCC circuitry 29, which is substantially similar to the WCC circuitry 29 of the welding power supply 12. Indeed, the WCC circuitry 29 of the wire feeder 14 may cooperate with the control circuitry 50 of the wire feeder 14 in similar ways as the welding power supply 12 cooperates with the control circuitry 22. The control circuitry 36 controls the operations of the wire feeder 14. In certain embodiments, the wire feeder 14 may use the control circuitry 50 to detect whether the wire feeder 14 is in communication with the welding power supply 12 and to detect a current welding process of the welding power supply 12 if the wire feeder 14 is in communication with the welding power supply 12.

A contactor 52 (e.g., high amperage relay) is controlled by the control circuitry 50 and configured to enable or inhibit welding power to continue to flow to the weld cable 36 for the welding application. As noted above, in certain embodiments, the contactor 52 may be an electromechanical device, while in other embodiments the contactor 52 may be any other suitable device, such as a solid state device. The wire feeder 14 includes a wire drive 54 that receives control signals from the control circuit 50 to drive rollers 56 that rotate to pull wire off a spool 58 of wire. The wire is provided to the welding application through a wire cable 60. Likewise, the wire feeder 14 may provide the shielding gas through the cable 48. As may be appreciated, in certain embodiments, the cables 36, 48, and 60 may be bundled together or individually provided to the welding torch 16.

The welding torch 16 delivers the wire, welding power, and shielding gas for a welding application. The welding torch 16 is used to establish a welding arc between the welding torch 16 and a workpiece 62. In certain embodiments, the welding torch 16 may include the WCC circuitry 29, which is substantially similar to the WCC circuitry 29 of the welding power supply 12. Indeed, the WCC circuitry 29 of the welding torch 16 may interact in similar ways as the welding power supply 12 cooperates with the control circuitry 22. A work cable 64, which may be terminated with a clamp 66 (or another power connecting device), couples the welding power supply 12 to the workpiece 62 to complete a welding power circuit.

As noted above, the WCC system 28 may include the WCC circuitry 29 and the low power transceiver 38. In certain embodiments, the low power transceiver 38 may be disposed within the welding system 10 anywhere along the length of the weld cable 36. Specifically, in certain embodiments, the low power transceiver 38 may be coupled to the weld cable 36 via a cable coupler 39. The cable coupler 39 may clamp the low power transceiver 38 to the weld cable 36 via one or more secure connections. In certain situations, the low power transceiver 38 may be coupled to the weld cable 36 between the wire feeder 14 and the welding torch 16, such that the low power transceiver 38 is closer to the welding torch 16 than the wire feeder 14. In some situations, the low power transceiver 38 may be coupled to the weld cable 36 anywhere between the welding torch 16 and the wire feeder 14 or between the welding torch 16 and the welding power supply 12.

As noted above, the WCC circuitry 29 may include the DAC 37, the ADC 40, and/or the filter function 42. The DAC 37 may be configured to transmit data communications utilizing one or more carrier channels or "tones." Specifically, the one or more tones may be described as complex sinusoidal signals that are transmitted by the DAC 37. For example, in the illustrated embodiment, the DAC 37 may be configured to transmit the tones to one or more components of the welding system 10, such as to the welding power supply 12 and/or the wire feeder 14. In certain embodiments, the DAC 37 may transmit modulated tones and/or unmodulated tones. Modulated tones may be utilized to communicate (e.g., send/receive) data using one or more known techniques for modulating a signal for data transmission. For example, the DAC 37 may utilize a hybrid amplitude and phase modulation scheme, such as Bi-Phase Shift Keying (BPSK), Quadrature Phase Shift Keying (QPSK), 16-ary Quadrature Amplitude Shift Keying (16-QAM) or similar variations. The modulated tones transmitted may include any type of information useful for the welding process or operation. For example, in some situations, the data transmitted by the WCC system 28 may include information related to any welding parameter (e.g., weld voltage, wire speed) that is transmitted to the wire feeder 14 and/or the welding torch 16 for welding applications.

In some embodiments, the DAC 37 may also transmit unmodulated tones (also known as "pilot tones") that do not carry data. Specifically, unmodulated tones may be sinusoidal signals that have predefined or known characteristics, such as a predefined amplitude, frequency, and phase. For example, for a given process, the DAC 37 may transmit unmodulated tones which are unmodulated sinusoidal waveforms each having the same amplitude but a different frequency, which may be an integral multiple of a lower reference frequency and a phase offset value. In particular, in certain embodiments, modulated tones may be distinguishable from unmodulated tones based on their assigned frequency, or their position within an OFDM frame. For example, the positional assignment of modulated versus unmodulated tones may be pre-assigned and this position may be known at the ADC 40. Since the characteristics of the unmodulated tones are also known, unmodulated tones may be utilized as reference tones. In certain embodiments, a set of modulated tones with known characteristics may also be transmitted. For example, modulated tones with a known data modulation scheme, and a known (or predefined) data sequence may be transmitted in lieu of and/or along with the known unmodulated tones.

Accordingly, the data sequence may be of the form of cyclic prefix within the OFDM frame, for example, such that the last N symbols of an OFDM frame are appended to the beginning of the frame. At the ADC 40 (e.g., receiver), a circular convolution of the received frame may be performed and the results of that convolution may be used to compute the equivalent frequency and time dependent amplitude and phase distortion in the weld cable 36, and from that information a set of coefficients for a correcting channel equalization filter (e.g., an inverse function of the measured distortion) may be determined. Accordingly, in certain embodiments, either a known modulated or a known unmodulated tone may be utilized as a reference tone. In certain embodiments, the DAC 37 may transmit a plurality of tones, any number of which may be modulated or unmodulated. For example, out of 64 tones transmitted by the DAC 37 of the tones may be modulated tones utilized for data transmission and 16 tones may be unmodulated tones utilized as reference tones (without any data modulation). It should be noted that the DAC 37 may be configured to transmit any number of modulated tones and unmodulated tones.

In certain embodiments, an orthogonal frequency-division multiplexing (OFDM) scheme may be utilized by the DAC 37 to transmit the modulated and unmodulated tones on multiple carrier frequencies (e.g., frequency-division multiplexing). For example, within the OFDM scheme, the DAC 37 may be configured to transmit the one or more tones over several parallel data streams or channels at a low modulation rate, thereby maintaining transmission characteristics that are similar to a single-carrier modulation scheme. In particular, the frequency-division multiplexing scheme may divide a single transmission medium having a particular total bandwidth into a series of frequency sub-bands that are each configured to carry a particular signal. In this manner, the single transmission medium (e.g., the weld cable 36) may be shared by multiple separate unmodulated or modulated tones.

In certain embodiments, the WCC system 28 may be configured to function in a power save mode that does not engage in transmitting and receiving weld data or communications. In such embodiments, the low power transceiver 38 may be utilized to transmit tones using less power. For example, the low power transceiver 38 may be configured to transmit a single unmodulated tone (e.g., pilot tone) for a brief period of time before the unmodulated tone is terminated and a subsequent unmodulated tone is transmitted. The tones may be transmitted with a known frequency and a known amplitude and phase, and may be transmitted with a known assignment in time between tone transmissions. In this manner, a plurality (e.g., 2, 3, 4, 5, 6, 7, or more) of unmodulated tones may be transmitted by the low power transceiver 38 one at a time until all of the unmodulated tones are sent. It should be noted however, that in certain embodiments, the low power transceiver 38 may monitor and minimize power consumption by transmitting both unmodulated and modulated tones. For example, either the unmodulated or the modulated tones may be transmitted one at a time, until a desired number of tones are transmitted.

In certain embodiments, the low power transceiver 38 includes one or more processors 41 (e.g., microprocessors 41), the low power DAC 43 (configured as the low power transmitter 43), the low power ADC 45 (configured as the low power receiver 45), the low power filter function 47, a memory 34, and/or a storage 32. The low power DAC 43 and the low power ADC 45 may be built into the processor 41 or may be separate from the processor 41. In embodiments where the low power DAC 43 and the low power ADC 45 are separate from the processor 41, the cable coupler 39 may include multiple connections between the low power transceiver 38 and the weld cable 36, such as one for each of the low power DAC 43 and the low power ADC 45. In particular, the low power transceiver 38 may utilize the low power DAC 43 and/or the low power ADC 45 in transmitting the modulated and unmodulated tones. For example, the low power DAC 43 may be configured to convert digital data within the processor 41 into an analog signal, such as an analog unmodulated signal that is transmitted to the WCC circuitry 29 within the welding power supply 12 or the wire feeder 14. It should be noted that in certain embodiments, the low power ADC 45 or the low power DAC 43 may include calibration features that measure the signals transmitted (e.g., modulated tones or unmodulated tones) and adjust characteristics of the signals (e.g., amplitude, phase, frequency, etc.) to be within an acceptable error range. In this manner, the low power ADC 45 or the low power DAC 43 may be configured to compensate and/or mitigate for manufacturing tolerance and drift over time and over various temperature fluctuations.

In certain embodiments, the low power ADC 45 may be configured to receive the modulated and unmodulated tones transmitted by the WCC circuitry 29, as described with respect to FIGS. 2-3. For example, the low power ADC 45 may be configured to receive modulated and unmodulated tones transmitted by the DAC 37 on multiple carrier frequencies utilizing the OFDM scheme. Accordingly, in certain embodiments, the low power ADC 45 may utilize less power by receiving the one or more modulated or unmodulated tones one at a time (receive a single tone spaced apart in a predefined time-period). In certain embodiments, the low power transceiver 38 may include the low power filter function 47, while in other embodiments, the low power filter function 47 may be independent of the low power transceiver 38.

The filter function 42 and/or the low power filter function 47 may be configured to process and analyze the modulated and unmodulated tones received by the ADC 40 to determine coefficients that characterize the weld cable 36. For example, the filter function 42 of the WCC circuitry 29 may be configured to apply a digital filter function that is configured to compare the unmodulated tones transmitted by the DAC 37 with the unmodulated tones received by the ADC 40. Likewise, the low power filter function 47 may be configured to compare the unmodulated tones transmitted by the low power DAC 43 with the unmodulated tones received by the low power ADC 45. In particular, based on the differences (if any) between the transmitted unmodulated tones and received unmodulated tones, the filter function 42 or the low power filter function 47 may be configured to determine one or more coefficients (e.g., values, polynomials). In certain embodiments, the one or more coefficients may correspond to distortive characteristics of the weld cable 36. Furthermore, the filter function 42 or the low power filter function 47 may be configured to utilize the determined coefficients to compensate for distortive characteristics of the weld cable 36, such as frequency and time dependent amplitude and phase distortion, as further described with respect to FIGS. 2-3. In certain embodiments, the WCC circuitry 29 is configured to communicate with the control circuitry 22 (or the control circuitry 50), which may be configured to adjust a welding voltage or a wire speed provided to the welding torch 16 based on information received from the filter function 42 or the low power filter function 47.

Further, in certain embodiments, such as when the WCC system 28 is configured to operate within a power save mode, the low power ADC 45 may be configured to receive the unmodulated tones transmitted by the low power transceiver 38. For example, the low power ADC 45 may be configured to receive each unmodulated tone transmitted by the low power DAC 43 one at a time. Further, in certain embodiments, the low power filter function 47 may be configured to apply the digital filter function in order to compare each unmodulated tone received by the low power ADC 45. It should be noted that the low power filter circuitry 47 may utilize less power to compare a single transmitted unmodulated tone against a single received unmodulated tone than the filter circuitry 42 would use to compare one or more transmitted unmodulated tones against one or more received unmodulated tones. Accordingly, utilizing the low power transceiver 38 instead of the WCC circuitry 29 may provide the WCC system 28 and the welding system 10 with the most power saving benefits. However, it should be noted that any combination of transmitters and receivers may be utilized to save or conserve power. For example, in certain embodiments, the low power transceiver 38 may transmit one or more tones (e.g., modulated and/or unmodulated), each tone transmitted individually and at a predefined time period apart, that are received by the ADC 40 and processed by the filter function 42.

Further, in certain embodiments, the storage device 32 or the memory device 34 may be configured to store data related to the WCC system 28, such as characteristics (e.g., a phase, an amplitude, a frequency) of each unmodulated or modulated tone transmitted or received by the WCC system 28, information related to the frequency of each tone transmitted or received by the WCC system 28, the number and/or grouping of the unmodulated or modulated tones, the one or more determined frequency and time dependent amplitude and phase distortions in the weld cable 36, the location of the ADC 40, the one or more channel equalization filter coefficients calculated or determined by the WCC system 28, a current, previous, actual, or corrected welding operating parameter (e.g., welding voltage, wire speed), and any other information related to the WCC system 28. In addition, in certain embodiments, the storage device 32 or the memory device 34 may be configured to store one or more templates of unmodulated (e.g., reference) or modulated tones that have known characteristics. For example, the one or more templates may include 16 unmodulated tones each having a known amplitude, a known frequency, and a known phase shift from a reference. When one or more unmodulated tones are received by the WCC system 28, the WCC system 28 may be configured to compare the received modulated or unmodulated tones with a corresponding template.

In particular, the low power transceiver 38 may be configured as welding accessory device that may be retroactively coupled to the weld cable 36 or retroactively disposed within a component of the welding system 10 (e.g., the welding power supply 12 or the wire feeder 14). Further, it should be noted that the low power transceiver 38 may enable a legacy welding system 10 to determine one or more coefficients that are utilized to characterize distortion in the weld cable 36 and compensate for frequency and time dependent amplitude and phase distortions, even if the legacy welding system 10 is not configured with the DAC 37, the ADC 40, and/or the filter function 42. In this manner, the legacy welding system 10 retroactively fitted with the low power transceiver 38 may compensate for various distortive characteristics (e.g., frequency and time dependent amplitude and phase distortion) of the weld cable 36 even if the system 10 is not enabled for weld cable communications.

FIG. 2 is a flow diagram of an embodiment of a method 66 for correcting a distortive characteristic of the weld cable 36 in the weld system 10, in accordance with aspects of the present disclosure. Specifically, the distortive characteristic may be a frequency and time dependent amplitude and phase distortion of the weld cable 36. The distortive characteristic may be determined by determining one or more channel equalization filter coefficients. Further, the WCC circuitry 28 may compensate for the distortive characteristic by utilizing the determined channel equalization filter coefficients.

As noted above with respect to FIG. 1, the WCC system 28 of the welding power supply 12 may be configured to determine one or more channel equalization filter coefficients that characterize the distortion through the weld cable 36. Specifically, the one or more channel equalization filter coefficients may be values that correspond to the distortive characteristics of the weld cable 36. For example, the channel equalization filter coefficients may be representative of a distortive characteristic of the weld cable 36. In other words, the channel equalization filter coefficients may be representative of frequency and time dependent amplitude and phase distortions of the weld cable 36. In this manner, the systems and methods described herein allow for the various distortive characteristics (e.g., frequency and time dependent amplitude and phase distortion) of the weld cable 36 and obviate the need for taking actual measurements to characterize distortion through the weld cable 36, as further described in detail below. Further, the one or more channel equalization filter coefficients may be utilized to compensate for distortive characteristics (e.g., frequency and time dependent amplitude and phase distortion) within the weld cable 36 that may influence the power or data being transmitted. For example, certain embodiments address situations in which the welding voltage provided by the welding power supply 12 would be substantially different than the welding voltage received by the welding torch 16 due to one or more distortions of the weld cable 36 if not mitigated. Accordingly, the WCC system 28 may be configured to determine one or more channel equalization filter coefficients that may be representative of the distortive characteristics caused by travel through the weld cable 36. Further, the WCC system 28 may be configured to utilize the one or more channel equalization filter coefficients that are determined to compensate for any distortive characteristics within the weld cable 36, as further described below.

The method 66 begins with the WCC system 28 transmitting modulated tones and unmodulated tones (block 68). Specifically, the DAC 37 or the low power DAC 43 of the WCC system 28 may be configured to transmit the modulated and unmodulated tones. As noted above, modulated tones may include information related to the welding process or operation, such as information related to an operating parameter (e.g., weld voltage, wire speed) of the welding system 10 or related to an adjusted operating parameter of the welding system 10. In particular, unmodulated tones (e.g., pilot tones) transmitted by the DAC 37 or the low power DAC 43 may not carry any information related to the welding process or operation. Instead, unmodulated tones may be sinusoidal reference tones or signals that have predefined or known characteristics, such as a predefined amplitude, frequency, and/or phase. For example, in certain embodiments, all of the unmodulated tones transmitted may have different frequencies, a different starting phase, and the substantially equal amplitude. In certain embodiments, the unmodulated tones transmitted may have different frequencies and different starting phases, but may have unequal but predefined amplitudes. In certain embodiments, the modulated tones transmitted may also have known characteristics that allow the modulated tones to be utilized as the reference tones. For example, each of the unmodulated tones transmitted may be equally spaced in tone frequency, with the frequencies each an integer multiple of a reference frequency, and such that each succeeding tone increments its phase reference to the first tone by 90 degrees. For example, if a first unmodulated tone is at a reference of 0 degrees of phase, a second unmodulated tone may be at 90 degrees phase, a third unmodulated tone may be at 180 degrees phase, and so forth. It should be noted that the unmodulated tones may be configured at any alternate unmodulated tone configuration, so long as the frequency, amplitude, and phase configurations are known. For example, in certain embodiments, the phase of each unmodulated tone need not be equally spaced, so long as the phase is known.

In certain embodiments, the low power DAC 43 may be configured to transmit only unmodulated tones to the welding power supply 12 or the wire feeder 14. Specifically, the low power DAC 43 may transmit a series of unmodulated tones that are separated with a predetermined time period. For example, the low power DAC 43 may transmit a single unmodulated tone for a brief period of time, and then may terminate the unmodulated tone before sending a subsequent unmodulated tone. Indeed, the low power DAC 43 may be configured to save energy by transmitting only unmodulated tones one at a time. Further, it should be noted that the unmodulated tones transmitted by the low power DAC 43 may include the same properties or characteristics as the unmodulated tones transmitted by the DAC 37. In addition, in certain embodiments, the low power DAC 43 may be configured to function substantially similarly to the DAC 37. For example, the low power DAC 43 may also transmit a plurality of modulated or unmodulated tones simultaneously, or may transmit modulated tones one at a time.

The method 66 further includes the WCC system 28 receiving the transmitted modulated and unmodulated tones at the ADC 40 (block 70). In certain embodiments, the DAC 37 may transmit the modulated tones and unmodulated tones to the welding torch 16 and may receive the transmitted tones from the welding torch 16. In such situations, the WCC system 28 may be configured to account or compensate for the distortion of the weld cable 36 twice and/or in two directions (e.g., a first distortion from the WCC system 28 to the welding torch 16 and a second distortion from the welding torch 16 to the WCC system 28). In other embodiments, the low power DAC 43 may be configured to transmit a series of time-spaced unmodulated tones (or the modulated tones). In such situations, the WCC system 28 may be configured to account or compensate for the distortion of the weld cable 36 once and/or in one direction. In either situation, the ADC 45 may be configured to receive the modulated and unmodulated tones, and may also be configured to receive the original location from which the tones were transmitted.

The ADC 40 may provide the received tones (e.g., modulated and unmodulated) to the filter function 42 for further processing. In certain embodiments, the low power ADC 45 may provide the received tones (e.g., modulated and unmodulated) to the low power filter function 47 for further processing. Further, in certain embodiments, the method 66 includes applying a digital filter function (channel equalization filter) to the received modulated and unmodulated tones with the filter function 42 or the low power filter function 47 (block 72). As noted above, the digital filter function may be utilized to compare the transmitted unmodulated tones with the received unmodulated tones. As noted above, the transmitted unmodulated tones are transmitted with a known amplitude, frequency, and phase. Accordingly, in certain embodiments, the transmitted unmodulated tones are known a priori at the receiver and may be utilized as reference tones and compared with the received unmodulated tones within the filter function 42 or the low power filter function 47 to determine one or more differences, such as differences in phase, amplitude, or frequency. Based on the differences between the transmitted and received unmodulated tones, the filter function 42 or the low power filter function 47 may be configured to determine the frequency and time dependent amplitude and phase distortion in the weld cable 36 between the transmitters and the receivers. Specifically, the frequency and time dependent amplitude and phase distortion may correspond to the distortive characteristics of the weld cable 36, as further described with respect to FIG. 3.

Further, the method 66 includes compensating for the frequency and time dependent amplitude and phase distortion (e.g., distortive characteristic of the weld cable 36) utilizing the channel equalization filter coefficients (block 74). In certain embodiments, the WCC system 28 may be configured to adjust one or more welding parameters based on the one or more determined coefficients and based on the characteristics of the weld cable 36. For example, in certain situations, the WCC system 28 may increase or decrease a welding voltage provided to the wire feeder 14 and/or the welding torch 16 based on the calculated channel equalization filter coefficients. As a further example, the WCC system 28 may be configured to increase or decrease a wire speed provided by the wire feeder 14 based on the calculated channel equalization filter coefficients. In some embodiments, the WCC system 28 provides this information to the control circuitry 22, so that the control circuitry 22 may make the proper adjustments to the welding parameters and/or provide the information to other components of the welding system 10. In short, the WCC system 28 may be configured to provide to the welding system 10 the determined and/or calculated distortive characteristics and/or coefficients of the weld cable 36. Accordingly, the calculated or determined distortive characteristics and/or coefficients may be provided by the control circuitry 22 as actual feedback to other components of the welding system 10.

In particular, the method 66 may be utilized as a continuous feedback loop 75 that allows for the correction of power transmitted via the weld cable 36 in subsequent times based on the information calculated and determined. In this manner, the WCC system 28 may be configured to regulate and correct for any frequency and time dependent amplitude and phase distortion of the weld cable 36 in a dynamic process during the operation of the welding torch 16. Accordingly, more accurate welding operating parameters may be utilized during the welding process. For example, with the continuous feedback loop 75, the WCC system 28 may dynamically adjust the welding voltage provided to the welding torch 16 and workpiece 62 during the welding process.

FIG. 3 is a flow diagram of an embodiment of a method 76 for calculating the one or more channel equalization filter coefficients of FIG. 2, in accordance with aspects of the present disclosure. As noted above, the filter function 42 or the low power filter function 47 of the WCC system 28 may be configured to apply a digital filter function to the modulated and unmodulated tones received by the ADC 40 or the low power ADC 45. In certain embodiments, the filter function 42 or the low power filter function 47 may be configured to calculate or determine one or more channel equalization filter coefficients based on the modulated and unmodulated tones received by the ADC 40 or the low power ADC 45, as further described below.

In certain embodiments, the method 76 begins with separating the unmodulated tones from the modulated tones received by the ADC 40 and/or the low power ADC 45 (block 78). For example, the low power ADC 45 may receive each of the 16 unmodulated tones one at a time set apart at a predefined timer period. As a further example, the ADC 40, however, may receive 64 tones at once, of which 48 tones are modulated tones utilized for data transmission and 16 tones are unmodulated tones. Accordingly, unmodulated tones may be separated from the modulated tones by the matrix algebra for further processing to determine the channel equalization filter coefficients.

In certain embodiments, the method further includes compensating for timing and phasing of the unmodulated tone(s) (block 80). For example, in some situations, there may be one or more clocking variations between the low power DAC 43 (or the DAC 37) and the low power ADC 45 (or the ADC 40). Accordingly, the filter function 42 or the low power filter function 47 may be configured to compensate for the frequency error between the transmitter and receiver with one or more frequency and/or phase control loops. In particular, the ADC 40 may be configured to associate each transmitted tone with a corresponding received tone. For example, 16 unmodulated tones may be transmitted by the DAC 37 with a known amplitude, a known frequency, and at a known phase shift. Accordingly, each of the 16 transmitted unmodulated tones may correspond to each of the 16 received unmodulated tones. In certain embodiments, compensating for frequency and phase may include associating the transmitted tone with its corresponding received tone. In certain embodiments, the method 76 may be configured to compensate and correct for the frequency variations between the DAC 37 and the ADC 40 before separating the modulated tones from the unmodulated tones. In other embodiments, the method 76 may be configured to compensate and correct for the clocking variations between the low power ADC 45 and the low power DAC 43 before associating the transmitted unmodulated tone with the received unmodulated tone.

Furthermore, the method 76 may include measuring the characteristics (e.g., phase, amplitude, and/or frequency) of the received unmodulated tone(s). Accordingly, in certain embodiments, the filter function 42 or the low power filter function 47 may be configured to measure the actual amplitude and the actual phase of the received unmodulated tone(s) (block 82). As noted above, the transmitted unmodulated tones may be transmitted with a known frequency, a known amplitude, and a known phase and may thus be utilized as a reference tone. Accordingly, once the actual characteristics of the received unmodulated tones are determined, the method 76 may include comparing the characteristics of the received unmodulated tone(s) with the characteristics of the transmitted (reference) unmodulated tone(s) (block 84). Comparing the received unmodulated tone(s) and the transmitted (reference) unmodulated tone(s) may be done in any suitable manner.

For example, in certain embodiments, the received unmodulated tones are multiplied by the complex conjugate of the original transmitted (reference) unmodulated tones. The expected result of a vector multiplied by its complex conjugate is a vector with an amplitude and no imaginary part. In this case, the expected answer would be "1+j0." The error vector resulting from the multiplication of the complex conjugate of the received unmodulated tones and the original transmitted (reference) tones is utilized to perform an interpolation. The interpolation populates missing members of the set of tones, at each indexed frequency, with a phasor with an interpolated amplitude and an interpolated phase. In certain embodiments, however, the actual result of a vector multiplied by its complex conjugate indicates an amplitude and phase distortion for each tone. For example, the actual answer is a series of vectors, each with amplitude and phase, for each pilot tone frequency. Accordingly, if 16 unmodulated tones received for an OFDM symbol length of 64, the actual result of the digital filter function process may be a 3×64 matrix with frequency, amplitude, and phase as column vectors and each of the 64 values assuming a row position. The 16 measured error vectors populate the positions in the 3×64 matrix assigned to the reference tones and the 48 'missing' tones, assigned to the data tones, are populated with interpolated values. The resulting 3×64 matrix is then used as the data to calculate the channel equalization filter and also the inverse of the channel equalization filter.

The filter function 42 or the low power filter function 47 may be configured to utilize the differences determined between the received unmodulated tones and the transmitted (reference) unmodulated tones to determine the channel equalization filter coefficients (block 86). As noted above, the channel equalization filter coefficients define a Finite Impulse Response (FIR) or Infinite Impulse Response (IIR) filter with a length that is determined by the number of tones used in the OFDM system, otherwise specified as the symbols in an OFDM frame, excluding any cyclic prefix, and which filter provides an inverse function to the frequency dependent amplitude and phase distortion of the weld cable 36. As further information, the inverse of the channel equalization filter is the analytic description of the two port transfer function of the weld cable as a transmission line. For example, the inverse of the channel equalization filter coefficients may be transformed, using a mathematical algorithm, to describe any characteristic or physical property of the weld cable 36 that may have an effect on the power or data transmitted by the weld cable 36. The transfer function (inverse channel equalization filter) may be representative of a length of the weld cable 36, a resistance, an inductance, and so forth. However, it should be noted that the inverse channel equalization filter (transfer function) is not the characteristic itself, but are merely an abstract representation of the characteristics as defined in a sampled time reference system.

In certain embodiments, the method 76 further includes utilizing the channel equalization filter coefficients determined from the unmodulated tone(s) pre-distort each of the modulated and unmodulated tones that will be transmitted by the DAC 37 (or in some embodiments, the low power transceiver 38) in the next iteration of the function (block 88). For example, the unmodulated tones may be multiplied with the modulated tones by the channel equalization (FIR) filter to correct for the frequency and time dependent amplitude and phase distortion of the weld cable 36 (e.g., distortive characteristic of the weld cable 36). Accordingly, in this manner, it may be beneficial to utilize the channel equalization filter coefficients to compensate for frequency and time dependent amplitude and phase distortion in the weld cable system (block 90). In certain embodiments, the method 76 calculates the channel equalization filter and its inverse function. The inverse function of the channel equalization filter provides the equivalent two port transfer function of the weld cable and can be used as an element in the feedback loop within the welding power supply 12 control system.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
a low power transceiver configured to be directly coupled to a weld cable via a cable coupler, wherein the low power transceiver comprises:
a low power transmitter configured to transmit a first signal comprising one or more unmodulated tones through the weld cable to a receiver of a welding power supply, wherein the one or more unmodulated tones have one or more predefined characteristics;
a low power receiver configured to receive a second signal having one or more unmodulated tones corresponding to the one or more predefined characteristics through the weld cable from a transmitter of the welding power supply; and
a first processor operatively coupled to a first memory, wherein the first processor is configured to execute instructions stored in the first memory to cause the first processor to:
compare the one or more predefined characteristics of the second signal to the one or more predefined characteristics of the first signal to determine one or more differences; and
determine one or more channel equalization filter coefficients related to the weld cable using the one or more differences of the one or more unmodulated tones of the second signal received by the low power receiver, wherein the one or more channel equalization filter coefficients comprise one or more coefficients based on the one or more unmodulated tones to correct a distortive characteristic of the weld cable.

2. The welding system of claim 1, wherein the distortive characteristic is a frequency and time dependent amplitude and phase distortion of the weld cable.

3. The welding system of claim 1, wherein each unmodulated tone from the one or more unmodulated tones of the first signal is separated by a predefined time period.

4. The welding system of claim 3, wherein each unmodulated tone of the one or more unmodulated tones of the first signal is a sinusoidal signal comprising a reference amplitude, a reference phase, a reference frequency, or a combination thereof, and wherein each unmodulated tone of the one or more unmodulated tones of the first signal is utilized as a reference signal.

5. The welding system of claim 1, wherein the low power transceiver is a welding accessory device that is retroactively coupled to the weld cable.

6. The welding system of claim 1, comprising a second processor disposed within the welding power supply or a wire feeder, wherein the second processor is operatively coupled to a second memory, wherein the second processor is configured to execute instructions stored in the second memory to cause the second processor to transmit and receive data related to a welding operating parameter through the weld cable and to determine the one or more channel equalization filter coefficients related to the weld cable corresponding to the distortive characteristic.

7. The welding system of claim 6, wherein the second processor is configured to execute instructions stored in the second memory to cause the second processor to transmit a modulated tone, and wherein the modulated tone is a complex signal utilized to send or receive data related to the welding operating parameter.

8. The welding system of claim 4, wherein the first processor is configured to execute instructions stored in the first memory to cause the first processor to apply a digital filter function to the one or more unmodulated tones of the second signal, and wherein the digital filter function is configured to determine the channel equalization filter coefficients related to the weld cable.

9. The welding system of claim 8, wherein the one or more unmodulated tones of the second signal comprises a received amplitude, a received phase, and a received frequency, and wherein the digital filter function is configured to compare the received amplitude, the received phase, and the received frequency to the reference amplitude, the reference phase, and the reference frequency to determine the distortive characteristic of the weld cable.

10. The welding system of claim 1, wherein the weld cable enables weld related communications between the welding power supply, a welding torch, and a wire feeder.

11. The welding system of claim 1, wherein the low power transceiver is coupled to a portion of the weld cable between a wire feeder and a welding torch, and wherein the low power transceiver is closer to the welding torch than the wire feeder.

12. A welding system, comprising:
a low power transceiver configured to be directly coupled to a weld cable via a cable coupler, wherein the low power transceiver comprises:
a low power transmitter configured to transmit a first signal comprising one or more unmodulated tones through the weld cable to a receiver of a wire feeder, wherein the one or more unmodulated tones have one or more predefined characteristics;
a low power receiver configured to receive a second signal having one or more unmodulated tones corresponding to the one or more predefined characteristics through the weld cable from a transmitter of the wire feeder; and
a first processor operatively coupled to a first memory, wherein the first processor is configured to execute instructions stored in the first memory to cause the first processor to determine one or more channel equalization filter coefficients related to the weld cable using one or more differences between the one or more unmodulated tones of the second signal received by the low power receiver and the one or more unmodulated tones of the first signal,
wherein the one or more channel equalization filter coefficients comprise one or more coefficients based on the one or more unmodulated tones to correct a distortive characteristic of the weld cable.

13. The welding system of claim 12, wherein the low power transmitter transmits the one or more unmodulated tones of the first signal with a reference unmodulated tone, wherein the reference unmodulated tone comprises a reference amplitude, a reference phase, a reference frequency, or a combination thereof.

14. The welding system of claim 13, wherein the low power receiver receives the second signal comprising a received unmodulated tone of the one or more unmodulated tones, wherein the received unmodulated tone comprises a received amplitude, a received phase, a received frequency, or a combination thereof.

15. The welding system of claim 14, wherein the first processor is configured to execute instructions stored in the first memory to cause the first processor to compare the reference unmodulated tone with the received unmodulated tone to determine the one or more differences, and wherein the one or more differences comprise differences in an amplitude, a phase, a frequency, or a combination thereof.

16. The welding system of claim 15, wherein the first processor is configured to execute instructions stored in the first memory to cause the first processor to determine the one or more channel equalization filter coefficients based on the one or more differences.

17. The welding system of claim 12, wherein each reference unmodulated tone from is sent at a predefined time period apart.

18. A welding system comprising a low power transceiver directly coupled to a weld cable, the low power transceiver comprising:
- a low power transmitter to transmit a first signal comprising a reference unmodulated tone having one or more predefined characteristics through the weld cable to a welding power supply;
- a low power receiver to receive a second signal comprising an unmodulated tone corresponding to the one or more predefined characteristics through the weld cable from the welding power supply; and
- a processor operatively coupled to a memory, wherein the processor is configured to execute instructions stored in the memory to cause the processor to:
  - compare the one or more predefined characteristics of the reference unmodulated tone with the one or more predefined characteristics of the received unmodulated tone to determine one or more differences corresponding to one or more distortive characteristic of the weld cable, wherein the one or more differences comprise differences in an amplitude, a phase, or a frequency;
  - determine one or more channel equalization filter coefficients related to the one or more distortive characteristic of the weld cable based on the one or more differences; and
  - command the welding power supply to adjust one or more welding operating parameters to correct a distortive characteristic of the one or more distortive characteristics of the weld cable.

* * * * *